United States Patent
Feller et al.

(10) Patent No.: US 10,574,545 B2
(45) Date of Patent: *Feb. 25, 2020

(54) TECHNIQUES FOR ANALYTICS-DRIVEN HYBRID CONCURRENCY CONTROL IN CLOUDS

(71) Applicant: Telefonaktiebolaget LM Ericsson (publ), Stockholm (SE)

(72) Inventors: Eugen Feller, San Francisco, CA (US); Julien Forgeat, San Jose, CA (US); Muhammad Mudassar Nazar, Lahore (PK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

This patent is subject to a terminal disclaimer.

(21) Appl. No.: 16/004,683

(22) Filed: Jun. 11, 2018

(65) Prior Publication Data
US 2018/0295034 A1    Oct. 11, 2018

Related U.S. Application Data

(63) Continuation of application No. 14/949,703, filed on Nov. 23, 2015, now Pat. No. 10,015,062.

(51) Int. Cl.
*G06F 15/173*    (2006.01)
*H04L 12/24*    (2006.01)
*G06F 9/50*    (2006.01)

(52) U.S. Cl.
CPC ........ *H04L 41/5054* (2013.01); *G06F 9/5072* (2013.01); *H04L 41/0893* (2013.01)

(58) Field of Classification Search
CPC .............................. H04L 41/5054; H04L 41/0893; G06F 9/5072

USPC ........................................................ 709/226
See application file for complete search history.

(56) References Cited

U.S. PATENT DOCUMENTS 9,846,772 B1 * 12/2017 Satish .................. G06F 21/566
2016/0283270 A1    9/2016 Amaral et al.

OTHER PUBLICATIONS

"Apache Flink: Scalable Batch and Stream Data Processing," The Apache Software Foundation, downloaded from the internet at http://hadoop.apache.org/ on Nov. 22, 2015, last modified Oct. 30, 2015, 3 pages.
"K-means clustering," Wikipedia, downloaded form the Internet at https://en.wikipedia.org/wiki/K-means_clustering on Nov. 22, 2015, last modified Nov. 18, 2015, 10 pages.

(Continued)

*Primary Examiner* — Wing F Chan
*Assistant Examiner* — Joseph R Maniwang
(74) *Attorney, Agent, or Firm* — Sage Patent Group

(57) ABSTRACT

Exemplary techniques for analytics-driven hybrid concurrency control in clouds are disclosed that include a hybrid resource allocation module that can concurrently utilize an optimistic allocation scheme alongside a pessimistic allocation scheme. Machine learning techniques utilizing previous activity history of applications can be used to train a cluster model that is integrated by a hybrid resource allocation module to classify applications in either a pessimistic cluster or an optimistic cluster that identifies under which scheme requests from the applications will be processed.

21 Claims, 11 Drawing Sheets

(56) References Cited

OTHER PUBLICATIONS

"L/\2-Norm," Wolfram MathWorld, Wolfram Research, Inc., downloaded from the internet at http://mathworld.wolfram.com/L2-Norm.html on Nov. 22, 2015, 1 page.
"Welcome to Apache Hadoop," The Apache Software Foundation, downloaded from the Internet at https://flink.apache.org/ on Nov. 22, 2015, 6 pages.
Hindman, et al., "Mesos: a platform for fine-grained resource sharing in the data center," In Proceedings of the 8th USENIX conference on Networked systems design and implementation (NSDI'11), ACM, Mar. 30, 2011, 14 pages.
Schwarzkopf, et al., "Omega: flexible, scalable schedulers for large compute clusters," In Proceedings of the 8th ACM European Conference on Computer Systems (EuroSys '13), Apr. 15-17, 2013, 14 pages.
Zaharia, et al., "Resilient distributed datasets: a fault-tolerant abstraction for in-memory cluster computing," In Proceedings of the 9th USENIX conference on Networked Systems Design and Implementation (NSDI'12), Apr. 25-27, 2012, 14 pages.
Delgado P., et al.,"Hawk: Hybrid Datacenter Scheduling," USENIX Annual Technical Conference, USENIC ATC'15, Jul. 8, 2010, Retrieved from the Internet: <URL:https://pdfs.semanticscholar.org/b6e7/9ba4ecc34b4ad63bc778a3e10d2658e6e50a.pdf>, [retrieved on Feb. 3, 2017], pp. 499-510.
Karanasos K., et al., "Mercury: Hybrid Centralized and Distributed Scheduling in Large Shared Clusters," Jul. 10, 2015, Retrieved from the Internet: <URL:https://pdfs.semanticscholar.org/937c/83e2a4319cb8acb72b235a11e845b6010e17.pdf>, [retrieved on Feb. 3, 2017], pp. 1-13.

\* cited by examiner

TECHNIQUES FOR ANALYTICS-DRIVEN HYBRID CONCURRENCY CONTROL IN CLOUDS

CROSS-REFERENCE TO RELATED APPLICATIONS

This application is a continuation of application Ser. No. 14/949,703, filed Nov. 23, 2015, which is hereby incorporated by reference.

FIELD

Embodiments of the invention relate to the field of computing systems, and more specifically, to techniques for analytics-driven hybrid concurrency control in clouds.

BACKGROUND

Cloud computing is a model for enabling convenient, on-demand network access to a shared pool of configurable computing resources (e.g., networks, servers, storage, applications, and services) that can be rapidly provisioned and released with minimal management effort or service provider interaction. Accordingly, large data centers acting as clouds now power many of the high traffic services utilized today, including large search engines, social networks, and e-commerce websites.

Distributed resource management plays a key role in managing the applications (or, "frameworks") enabling services in such data centers. For example, some applications can include centralized web servers (e.g., Apache HyperText Transfer Protocol (HTTP) server), databases (e.g., MySQL), and distributed data processing systems such as Apache Spark, Hadoop, and Flink.

The execution of multiple applications can occur on a cluster provisioned on a private infrastructure or the infrastructure of a public cloud provider, such as Amazon Web Services (AWS). Such clusters can be statically or dynamically partitioned between the applications. For example, using static partitioning, an Apache Hadoop cluster could be deployed on five physical server computing devices while another set of server computing devices could be used to deploy Apache Spark.

An alternative approach is to dynamically partition the available servers/cluster by exposing a shared resource pool to the data processing applications via an application-programming interface (API). In this approach, it is up to the application to determine which resources it will use to schedule tasks. This approach can greatly simplify the design of applications, as an application does not need to be concerned with the management and allocation of the underlying distributed resources (e.g., allocation and provisioning of Virtual Machines (VMs) or containers). Moreover, such approaches can increase resource utilization across the physical resources, as these resources can now be dynamically shared across multiple applications. For example, Apache Spark map/reduce tasks can run along with Apache Hadoop map/reduce tasks and web request processing tasks. Over the past years, the cloud and big data communities have developed various resource management systems following such a shared resource pool model.

One such system is Apache Mesos. Mesos abstracts the machine resources such as the Central Processing Unit (CPU), memory, and storage away from the underlying physical machines or VMs. The system enables dynamic sharing of underlying resources and multiplexes them to multiple applications. Applications running on Mesos "see" resources as one shared resource pool. Thus, a particular application does not own resources; instead these are managed by Mesos and offered to different applications according to a resource allocation policy. In Mesos, the resource allocation policy follows a "pessimistic" approach. Pessimistic resource allocation works by offering all resources to only one application at a time. Thus, it is up to the application to decide upon which resources it will launch tasks (e.g., a map/reduce task, a web server). While the application is utilizing these resources, they are locked to other applications. Once the application is done with its work, the resources are then reclaimed as part of the shared resource pool and handed to another application. The term "pessimistic" aptly describes this approach because its design fundamentally assumes that conflicts between competing applications would happen frequently, and thus they should be avoided by locking out other applications from attempting to launch their own tasks on the utilized resources.

Another system based on a shared pool model is Omega. In contrast to Mesos (which uses a pessimistic resource allocation policy), Omega implements an "optimistic" resource allocation policy. In Omega, every application sees the entire state (i.e., the shared pool) of the cluster, and thus no per-application locking of resources is performed. Accordingly, applications compete for the resources by attempting to launch tasks on the resources. Thus, conflict resolution is performed by Omega in the event that two applications attempt to launch tasks requiring the same resources at the same time. Accordingly, the term "optimistic" is used because of the fundamental assumption that conflicts between competing applications will rarely occur.

These approaches utilized by Mesos and Omega, for example, can be seen as techniques for enforcing concurrency control in distributed systems. In the former case (i.e., the pessimistic resource allocation policy), the cluster state can be manipulated by one application at a time. In the latter case (i.e., the optimistic resource allocation policy), the cluster state can be manipulated by multiple applications concurrently.

SUMMARY

Systems, methods, apparatuses, and computer-readable media are provided for providing analytics-driven hybrid concurrency control in clouds. In some embodiments, a hybrid resource allocation module can provide access to cloud resources using both an optimistic resource allocation policy and also a pessimistic resource allocation policy concurrently.

In some embodiments, the hybrid resource allocation module can serve different applications differently based upon their membership in either an optimistic cluster or pessimistic cluster.

In some embodiments, a model can be generated based upon a history of previous activity of applications to identify which of the applications are likely to induce resource conflicts. Those of the applications found likely to induce conflicts can be placed in the pessimistic cluster and provided access to resources using the pessimistic resource allocation policy while those of the applications found not likely to induce conflicts can be placed in the optimistic cluster and provided access to resources using the optimistic resource allocation policy.

Accordingly, in some embodiments both high resource utilization is achieved and application starvation is significantly reduced when compared to use of either the optimistic or pessimistic resource allocation policy alone.

According to some embodiments, a method in a hybrid resource allocation module executing at a computing device efficiently provides access to cloud resources to a plurality of applications. The method includes receiving, at the hybrid resource allocation module from a first application of the plurality of applications, a request for available resource information of the cloud resources. The first application is attempting to launch a task using at least some of the cloud resources. The method further includes determining, by the hybrid resource allocation module, whether the first application has been categorized into an optimistic cluster or a pessimistic cluster. The method further includes, responsive to determining that the first application has been categorized into the optimistic cluster, setting a lock to prevent any of the plurality of applications categorized into the pessimistic cluster from being able to request any available resource information while the first application is still attempting to launch the task. The lock does not prevent any other applications categorized into the optimistic cluster from being able to request available resource information while the first application is still attempting to launch the task. The method also includes providing the available resource information to the first application.

In some embodiments, the method also includes, while the lock is set and while the first application is still attempting to launch the task, (A) receiving a second request for the available resource information from a second application of the plurality of applications, wherein the second application is attempting to launch a second task using at least some of the cloud resources, (B) determining whether the second application has been categorized into the optimistic cluster or the pessimistic cluster, and (C) responsive to determining that the second application has been categorized into the optimistic cluster, providing the available resource information to the second application. In some embodiments, the method further includes receiving, from the first application, a request to launch the task, causing the task to be launched, receiving, from the second application, a request to launch the second task, and determining, by the hybrid resource allocation module, whether a resource conflict results from the request to launch the second task.

In some embodiments, the method includes, while the lock is set and while the first application is still attempting to launch the task, (A) receiving a second request for the available resource information from a second application of the plurality of applications, wherein the second application is attempting to launch a second task using at least some of the cloud resources, (B) determining whether the second application has been categorized into the optimistic cluster or the pessimistic cluster, and (C) responsive to determining that the second application has been categorized into the pessimistic cluster, waiting to provide the available resource information to the second application until the lock is no longer set. In some embodiments, the method further includes (D) releasing the lock, (E) setting a second lock to prevent all other applications categorized into the pessimistic cluster and also all of the applications categorized into the optimistic cluster from being able to request any available resource information while the second application is still attempting to launch the second task, and (F) providing the available resource information to the second application.

In some embodiments, the method also includes generating a model based upon at least a history of activity involving the plurality of applications. The model can be executed to determine which of the plurality of applications to categorize into the optimistic cluster and which of the plurality of applications to categorize into the pessimistic cluster. In some embodiments, said generating of the model is based upon at least one or more resource reservation request conflicts from the history, and one or more task launch requests from the history. In some embodiments, the method further includes executing the model, resulting in at least one of the plurality of applications that was previously categorized into the pessimistic cluster to now be categorized into the optimistic cluster.

According to some embodiments, a non-transitory computer-readable storage medium has instructions which, when executed by one or more processors of a computing device, cause the computing device to efficiently provide access to cloud resources to a plurality of applications by performing operations. The operations include receiving, from a first application of the plurality of applications, a request for available resource information of the cloud resources. The first application is attempting to launch a task using at least some of the cloud resources. The operations further include determining whether the first application has been categorized into an optimistic cluster or a pessimistic cluster. The operations further include, responsive to determining that the first application has been categorized into the optimistic cluster, setting a lock to prevent any of the plurality of applications categorized into the pessimistic cluster from being able to request any available resource information while the first application is still attempting to launch the task. The lock does not prevent any other applications categorized into the optimistic cluster from being able to request available resource information while the first application is still attempting to launch the task. The operations further include providing the available resource information to the first application.

According to some embodiments, a system includes one or more server computing devices providing resources as part of a cloud computing environment and a hybrid resource allocation module that is communicatively coupled with the one or more server computing devices. The hybrid resource allocation module executes at one or more computing devices and efficiently provides access to the resources to a plurality of applications. The hybrid resource allocation module receives, from a first application of the plurality of applications, a request for available resource information of the cloud resources, wherein the first application is attempting to launch a task using at least some of the cloud resources. The hybrid resource allocation module determines whether the first application has been categorized into an optimistic cluster or a pessimistic cluster. The hybrid resource allocation module, responsive to determining that the first application has been categorized into the optimistic cluster, sets a lock to prevent any of the plurality of applications categorized into the pessimistic cluster from being able to request any available resource information while the first application is still attempting to launch the task. The lock does not prevent any other applications categorized into the optimistic cluster from being able to request available resource information while the first application is still attempting to launch the task. The hybrid resource allocation module also provides the available resource information to the first application.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
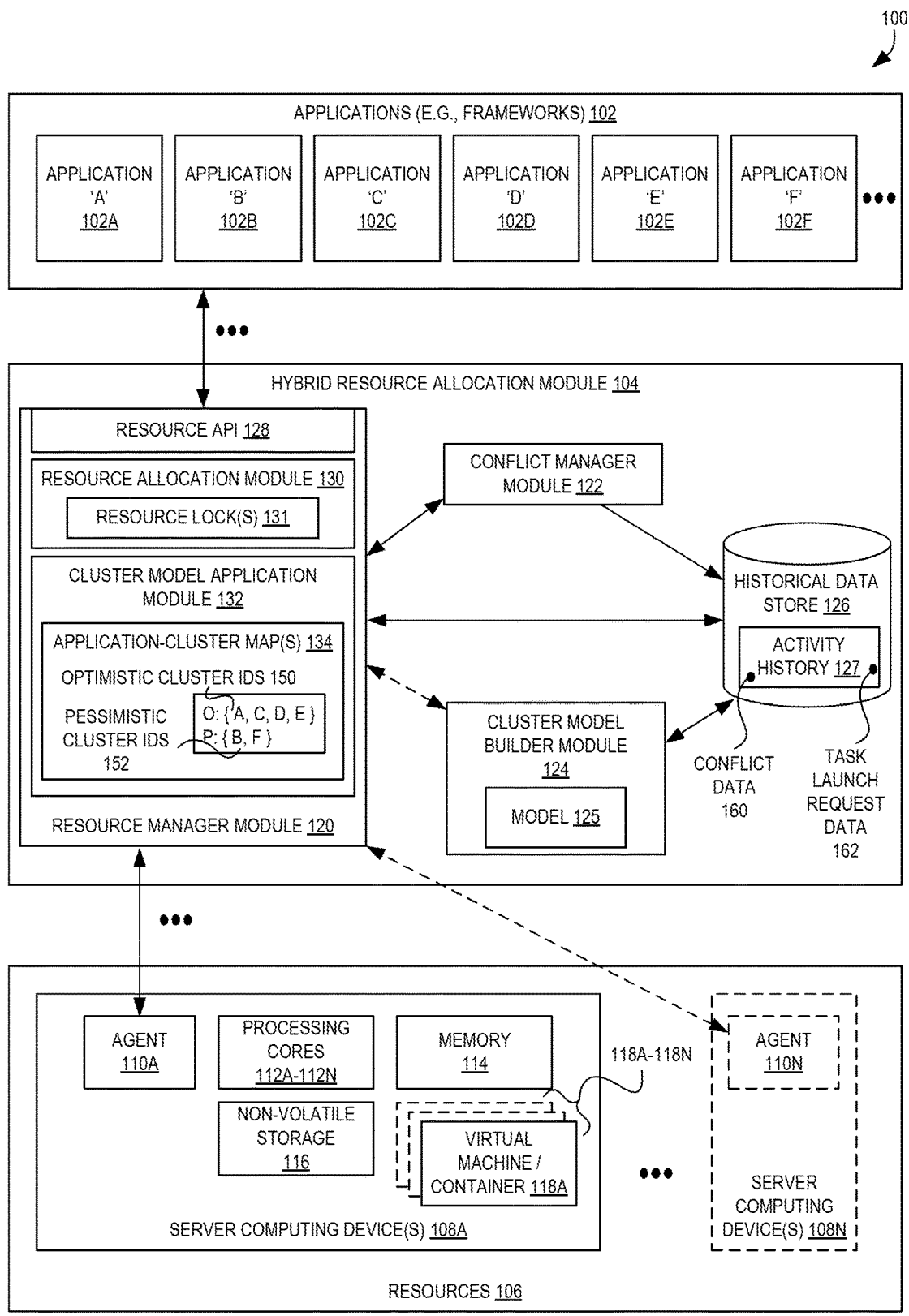
FIG. 1 is a high-level block diagram illustrating components of a system utilizing analytics-driven hybrid concurrency control of resources in a cloud according to some embodiments.

The following description relates to the field of computing systems, and more specifically, describes methods, systems, apparatuses, and computer-readable media for analytics-driven hybrid concurrency control in clouds.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

However, as used herein, the terms "framework" and "application" may be used somewhat synonymously to refer to a software application that can seek access to resources provided by a set of one or more computing devices. For example, a "framework" or "application" may seek to request that one or more "tasks" (e.g., a unit of work to be processed) be executed by a set of server computing devices of a cloud. Accordingly, unless expressly indicated or made clear by the context of use, these two terms may be used interchangeably.

Embodiments described herein provide analytics-driven resource allocation mechanisms for shared pool cloud data centers. In contrast to solutions that focus either upon pessimistic or optimistic resource allocation, embodiments herein can utilize both allocation schemes concurrently to realize the benefits of both while similarly reducing the negative aspects of each. In some embodiments, machine learning can be used to train a cluster model that is integrated by a hybrid resource allocation module to classify applications in either a pessimistic or optimistic cluster, e.g., depending on a historical number of resource conflicts. Accordingly, some embodiments can run both resource allocation policies concurrently. For example, if two applications "A" and "B" tend to have a low number of resource conflicts, they can be optimally served using the optimistic policy, while any remaining applications with high conflict potential can be served using the pessimistic policy. Thus, high resource utilization is achieved and application starvation is greatly reduced, which ordinarily could result in applications needing to wait for resources to be released.

Previously, distributed resource management solutions (e.g., Mesos, Omega) for data processing applications require a resource allocation policy in order to decide how many and which resources to offer to applications. These solutions exclusively support either pessimistic or optimistic resource allocation. Pessimistic resource allocation is prone to under-utilization as it locks resources on a per-application basis. In other words, during the time an application is busy deciding upon which particular resources tasks should be run, other applications are unable to take scheduling decisions. In contrast, other solutions utilize optimistic shared state resource allocation, where every application simultaneously can have access to currently-available cluster resources, thus avoiding the need for locks and theoretically improving resource utilization.

However such optimistic approaches are necessarily complex as they need to handle conflicts that can arise. A conflict results when more than one application attempts to consume/reserve the same underlying resources. Thus, in the event of conflict, only one application is allowed to consume resources, and all other application requests are discarded. This results in wastage of scheduling work, as conflicting jobs have to start over from scratch. Moreover, as the number of conflicts increases, such systems become less and less responsive as they become overwhelmed with performing conflict resolution.

These two resource allocation mechanisms, pessimistic and optimistic, represent two extremes. While one is prone to under-utilization, the other is prone to wastage of scheduling resources during conflicts. In other words, pessimistic resource allocation works well when a large number of conflicts exist between different applications, while optimistic resource allocation works well when conflicts are rare. However, none of these resource allocation approaches are good in an extremely frequent scenario where workloads vary significantly over time, and thus the number of conflicts depends on the workload being served at a particular time.

Accordingly, some embodiments herein utilize a hybrid resource allocation approach to solve the resource management problem in "shared pool" cloud platforms. Embodiments using a hybrid resource allocation scheme can exploit the fact that either pessimistic or optimistic resource allocation schemes can better suit different types of workloads. For example, pessimistic resource allocation can be a good fit for workloads with a high number of conflicts, but on the other hand, optimistic resource allocation can be a good fit for workloads with only rare conflicts.

Thus, some embodiments utilizing hybrid resource allocation can dynamically cluster applications according to collision domains. For example, in some embodiments a hybrid resource allocation can utilize two states, e.g., a pessimistic state and an optimistic state, and can use machine learning techniques to determine clusters of applications that are "good citizens," or those applications for which conflicts are rare. For clusters of such good citizen applications, optimistic resource allocation can be used to provide access to the resources. Similarly, the remaining clusters can be served using the pessimistic resource allocation strategy.

In some embodiments, a continuous online learning loop can be used to train a clustering model. The trained model can then be used to reclassify existing and new applications to the appropriate clusters. Applications from the pessimistic cluster, by definition, cannot cause conflicts. In some embodiments, applications can be periodically moved from the pessimistic cluster to the optimistic cluster in order to determine whether these applications have changed their conflict behavior and thus, the system can more optimally provide resource access in scenarios with such dynamic workloads.

Accordingly, some embodiments utilize a hybrid resource allocation module 104 that is positioned between the resources 106 to be managed and the applications 102 that need to run tasks on these resources. One such example is presented in FIG. 1, which is a high-level block diagram illustrating components of a system 100 utilizing analytics-driven hybrid concurrency control of resources 106 in a cloud 170 according to some embodiments.

The illustrated system 100 includes multiple applications/frameworks 102 (illustrated as application 'A' 102A to application 'F' 102F, for example) that seek access to resources 106 of a cloud 170 (e.g., public cloud, private cloud, or simply one or more electronic devices) via the hybrid resource allocation module 104. Thus, in some embodiments, the hybrid resource allocation module 104 is positioned (functionally, and possibly even physically) between the resources 106 to be managed and the applications 102 that need to run tasks on these resources.

As described earlier herein, the applications 102 can be entities that need access to resources 106 to execute tasks. Applications 102 can gain this access by sending requests (e.g., using a Resource API 128) for a list of available resources to the resource manager module 120 when the applications 102 need to start new tasks, although in some embodiments, the resource manager module 120 can periodically provide a list of available resources directly to the applications 102 or to a centralized distribution entity (not illustrated) to be made available to the applications 102.

Accordingly, resources 106 can be exposed according to an optimistic scheme between applications that rarely conflict with each other, whereas a pessimistic scheme can be used with applications for which conflicts are more likely to occur. Thus, according to the determined cluster for the requesting application, the resource allocation module 130 of the resource manager module 120 can provide access to the resources based upon a known current availability of the resources 106 as well as the optimistic or pessimistic resource allocation scheme associated with the cluster. Thus, at various points in time, using this hybrid approach the resource allocation module 130 can concurrently provide applications access to resources using only the pessimistic allocation scheme, the optimistic allocation scheme, or both the pessimistic and optimistic schemes.

As described above, hybrid resource allocation exploits the fact that pessimistic and optimistic resource allocation is a good fit for different types of workload. For example, pessimistic resource allocation is a good fit for workloads with a high number of conflicts. On the other hand, optimistic resource allocation is a good fit for workloads with rare conflicts. In some embodiments the hybrid resource allocation provides a way to dynamically cluster applications according to collision domains, and in some embodiments, the hybrid resource allocation module 104 utilizes two states: a pessimistic state and an optimistic state.

In some embodiments, each resource 106—e.g., a physical, virtual, or logical portion or slice of a server computing device 108A or other electronic device—can have one or more quantifiable resources, such as processing (e.g., CPU) cores 112A-112N or shares, memory 114, disk space (e.g., non-volatile storage 116), and/or virtual machines or containers 118A.

Representations of these resources 106 (e.g., a total availability amount, a current availability amount, an anticipated availability amount) can be reported to the resource manager module 120 of the hybrid resource allocation module 104 via agent 110A, which can be a software or hardware module configured to report such data.

In some embodiments, the hybrid resource allocation module 104 includes four components: a resource manager module 120, a conflict manager module 122, a cluster model builder module 124, and a historical data store 126.

The resource manager module 120, in some embodiments, serves as the central contact point to the resources 106. As described above, the resource manager module 120 can expose an API 128 that can be used by applications 102 to receive descriptions of available resources.

In some embodiments, information describing a general and/or current state of the resources is reported to the resource manager module 120 via one or more monitoring agents 110A-110N that can be deployed on one or more of the server computing devices 108A-108N. Resource availability can thus be reported to the resource manager module 120 in a variety of ways, such as through use of multi-dimensional vectors of: CPU, memory, network, and other dimensions (e.g., disk, etc.).

In some embodiments, the hybrid resource allocation module 104 is triggered as soon as an application requests access to resources (e.g., via resource API 128 calls). As discussed earlier, the pessimistic policy allows only a single application to be enabled to acquire resources at any one time. For example, the resource allocation module 130 can set a resource lock 131 while the single application is attempting to reserve resources, and thus, other applications may be unable to attempt to request resources while the lock 131 is set. In contrast, the optimistic policy can allows multiple applications to be enabled to acquire resources at one time.

For example, when the pessimistic policy is used, an application 'A' 102A can request available resources. Once application 'A' 120A receives resource information from the resource manager module 120, the application 120A can instruct the resource manager module 120 (e.g., via another API 128 call) to launch tasks on some or all of the available resources. For example, application 'A' 120A could instruct the resource manager module 120 to execute task "A" on a first server computing device 108A using five processing cores and five gigabytes (GB) of memory (e.g., Random Access Memory (RAM)). Assuming additional resources 106 are still available after servicing the request, the remaining un-used resources are "given back" or released to the resource manager module 120. The resource manager module may then select a next application 'D' 102D and provide it with descriptions of all the currently-available resources. This process can continue sequentially for all applications.

In contrast, under the optimistic policy, applications can consume all available resources concurrently (e.g., multiple applications can be provided available resource information at one point in time). When utilizing this optimistic policy, a conflict manager module 122 can be used to resolve potential resource conflicts between applications 102.

When conflicts occur between applications (e.g., when two applications attempt to reserve the same resource at the same time), the conflict manager module 122 is in charge of resolving the conflict. A variety of scenarios are possible. For example, if two or more applications are attempting to use the same resource at substantially the same time, but if said resource can accommodate both applications, then the conflict manager module 122 can determine that no actual conflict exists. However, if the resource(s) cannot fulfill the two (or more) requests at the same time, the conflict manager module 122 can choose which application gets the resource and can deny access to the other(s).

For example, in some embodiments the conflict manager module 122 serves two purposes: 1) resolving inter-application resource conflicts, and 2) tracking the number of per-application conflicts, and persisting this data to the activity history 127 of the historical data store 126 for further analysis.

For example, when application 'A' 102A and application 'D' 102D attempt to launch tasks on a same server computing device at substantially the same time, the conflict manager module 122 can determine whether a conflict exists (e.g., whether both of the requests can or cannot be accommodated simultaneously at a point in time). When a conflict is determined to exist, the conflict manager module 122 can cause the resource manager module 120 to remedy the situation, such as through allowing one of the requests to be placed and reporting back to the other application that its request cannot be placed at that time.

Resolving such inter-application resource conflicts can be performed using a variety of schemes. As one example, the conflict manager module 122 can use the following policy: the first application to launch tasks on a resource wins. Thus, if application 'A' 102A and application 'B' 102B both attempt to launch tasks on the same server computing device 108A and the request to launch a task from application 'A' 102A is received by the resource manager module 120 (or another component of the hybrid resource allocation module 104) first, application 'A' 102A will "win" and be provided access to the requested resources. In some embodiments, the other "losing" application 'B' 102B may receive a callback (e.g., the resource manager module 120 can send a callback message to the application) indicating that its task launch request was declined.

In some embodiments, the conflict manager module 122 (and/or the resource manager module 120) can store activity history 127 information in the historical data store 126 detailing the particular task launch requests 162 received from the applications, the current number of task launch requests per application, conflict data 160 describing whether a conflict was found to occur, etc.

To implement this hybrid resource allocation approach combining the benefits of both pessimistic and optimistic resource allocation, the resource manager module 120 in some embodiments can include a cluster model application module 132. The cluster model application module 132 can be triggered at a variety of times (e.g., periodically [e.g., every five minutes], according to a schedule, upon a particular event such as receipt of a new model or a message indicating the availability of a new model), and can perform one or both of: (1) assigning applications to the pessimistic cluster based on their conflict behavior, and/or (2) reassigning existing applications to another cluster because their conflict behavior has changed. The cluster model application module 132 can perform these actions through use of a model 125 trained by a cluster model builder module 124.

To perform these functions, the cluster model builder module 124 can train a cluster model 125 that can be used by the resource manager module 120 to cluster applications in two groups: pessimistic and optimistic. In some embodiments, the cluster model builder module 124 is an inline machine-learning component that periodically builds models 125 that determine clusters of applications according to the likelihood that conflicts will occur between them when they attempt to book resources. Thus, applications that seldom conflict which each other can be placed together into the same clusters according to the cluster model. The clusters can be identified to the resource manager module 120 and stored as application-cluster maps 134 so that the resource manager module 120 can select between optimistic and pessimistic modes for the applications.

In order to train the clustering model, the cluster model builder module 124 can use the activity history 127—e.g., the number of per-application conflicts, the total number of task launch requests per application, etc. The resulting model can be stored in a database (e.g., within the historical data store 126, within a different database) and/or provided to the cluster model application module 132 inside the resource manager module 120. In some embodiments, the model 125 takes an application identifier as an input, and can return the cluster identifier of which that application is to be assigned/categorized. Additional detail describing some techniques for the cluster builder model module 124 to generate the model 125 will be described later herein.

However, as described above, the cluster model builder module 124 can use activity history 127 for training the model 125. The historical data store 126 can be a database that keeps track of some or all of the following activity history 127 information: a total number or amount of available resources, an amount of currently-used resources, a total number of task launch requests per application (deemed "R"), binary indicators indicating whether a conflict has happened for a particular task launch request r and application j (deemed "c_rj"). In some embodiments, the total amount and total utilized amounts of resources can be represented as multi-dimensional vectors, including CPU, memory, and disk metrics.

In some embodiments the cluster model application module 132 can maintain an application-cluster map 134 indicating the mapping between one or more of the applications 102 and one or both of the resource allocation scheme clusters. For example, the cluster model application module 132 can include within the map 134 a set of zero or more application identifiers 150 of the optimistic cluster and/or a set of zero or more application identifiers 152 of the pessimistic cluster. In various embodiments, this application-cluster map 134 can be created using a variety of data structures and processing techniques known to those of skill in the art, including but not limited to arrays, linked lists, hash maps, bloom filters, etc.

In some embodiments, "new" applications can be initially assigned to the optimistic cluster and optionally moved to the pessimistic cluster depending on their conflict behavior. Note that by definition, conflict behavior cannot be obtained for applications in the pessimistic cluster as resources can only be offered to a single application at a time under the pessimistic allocation scheme. Thus, in order to determine whether conflict behavior for applications categorized into a pessimistic cluster has changed, the resource manager module 120 can be configured to periodically move applications from the pessimistic cluster to the optimistic cluster (e.g., by updating the application-cluster map 134). Accordingly, the cluster model builder module 124 can thereafter learn the new conflict behavior of such an application based upon observing its behavior while under the optimistic allocation scheme, thus allowing the reclassification of applications in the pessimistic cluster.

Thus, this hybrid resource allocation approach achieves the best properties of both pessimistic and optimistic resource allocation: good performance when conflicts are frequent yet high resource utilization when conflicts are rare. Specifically, compared to systems using only a pessimistic resource allocation policy, embodiments can limit the problem of under-utilization. Indeed, by clustering the applications in collision domains (e.g., clusters defined by frequency of collisions), only some of the clusters yield under-utilization and, even for such clusters, embodiments can reclassify these applications over time to use the optimistic strategy. Additionally, when compared to systems using only the optimistic allocation policy, embodiments using this hybrid resource allocation approach are able to support situations where conflicts appear frequently by clustering the conflicting applications and enable the pessimistic policy for these problematic applications.

Figure 2:
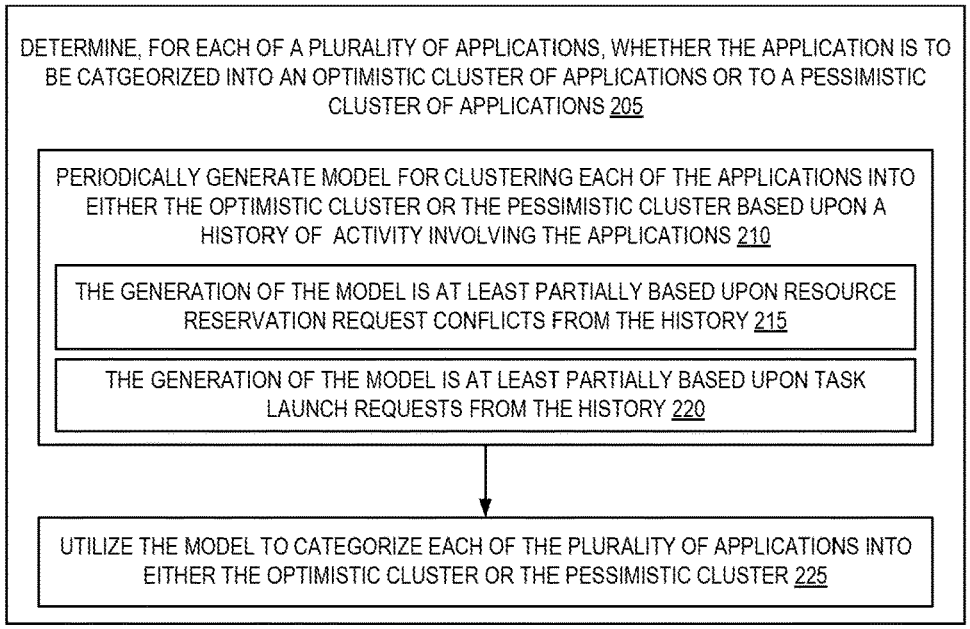
FIG. 2 includes a flow diagram illustrating a flow for utilizing analytics-driven hybrid concurrency control of resources in a cloud according to some embodiments, and another flow diagram illustrating a flow for utilizing a model to assign applications to either an optimistic cluster or a pessimistic cluster according to some embodiments.
Figure 2:
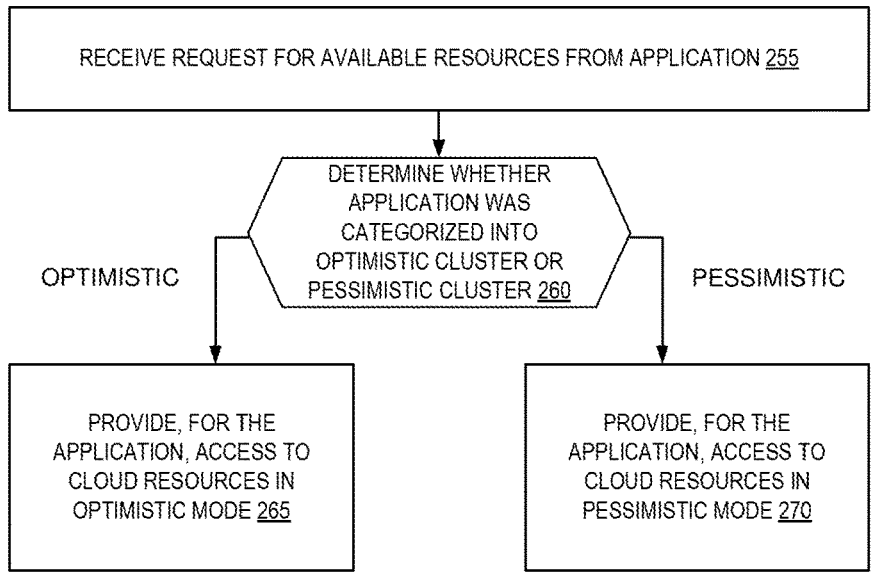

Turning to FIG. 2, a flow diagram is presented that illustrates a flow 200 for utilizing analytics-driven hybrid concurrency control of resources in a cloud according to some embodiments, and another flow diagram is presented illustrating another flow 250 for utilizing a model to assign applications to either an optimistic cluster or a pessimistic cluster according to some embodiments. In some embodiments, the operations of one or both of these flows 200, 250 can be performed by the hybrid resource allocation module 104 of FIG. 1.

At block 205, the flow 200 includes determining, for each of a plurality of applications, whether the application is to be assigned to (e.g., categorized into) an optimistic cluster of applications or to a pessimistic cluster of applications. This determination can include, at block 210, periodically generating a model for clustering each of the applications into either the optimistic cluster or the pessimistic cluster based upon a history of activity involving the applications. In some embodiments, block 210 is performed by the cluster model builder module 124 of FIG. 1.

Block 210 can include block 215, where the generation of the model is at least partially based upon resource reservation request conflicts from the history, and can include block 220, where the generation of the model is at least partially based upon task launch requests from the history.

The flow 200 can also include, at block 225, utilizing this model to assign each of the plurality of applications to either the optimistic cluster or the pessimistic cluster. Based upon these assignments, these applications can be provided access to reserve resources according to the corresponding resource allocation policy, i.e., either pessimistic or optimistic allocation.

With the plurality of applications assigned to the clusters, flow 250 includes block 255, where a request is received from an application for available resources. At decision block 260, a determination is made as to whether this requesting application is assigned to (e.g., categorized into) the optimistic cluster or the pessimistic cluster.

Figure 3:
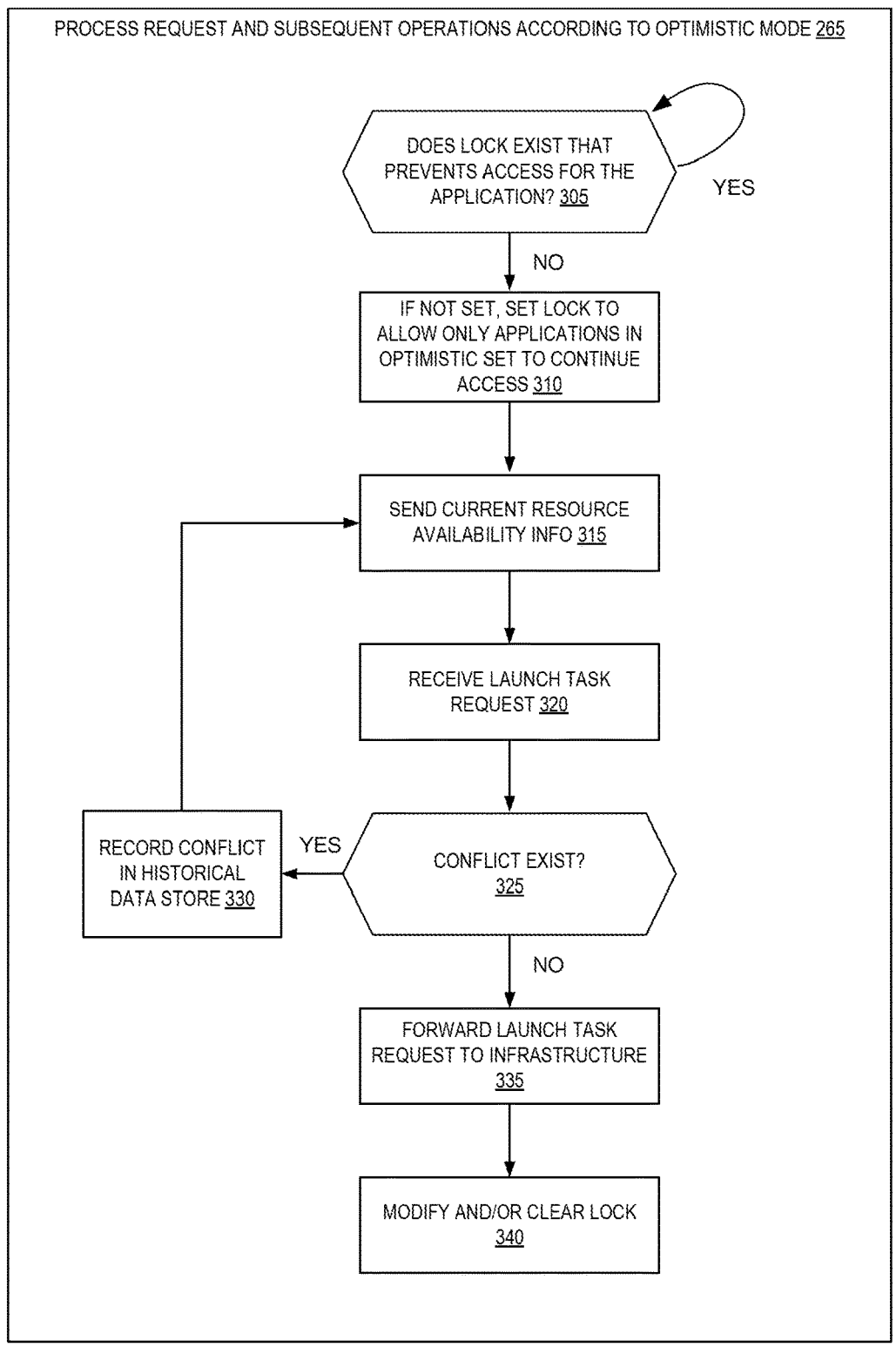
FIG. 3 is a flow diagram illustrating a flow for request processing in an optimistic mode according to some embodiments.

When the application is assigned to (e.g., categorized into) the optimistic cluster, the flow 250 continues to block 265, where access to the cloud resources is provided to the application using the optimistic allocation mode. For an example of block 265, we turn to FIG. 3, which is a flow diagram illustrating a flow 300 for request processing in an optimistic mode according to some embodiments.

Initially, decision block 305 includes determining whether a lock exists (or is set) that prevents access for the application. If so, the flow can continue with this block indefinitely or for a time period (e.g., acting as a spin-lock) or the flow can optionally terminate. If there is no lock determined to exist (or when it is released), the flow can continue to block 310, where, if not set, a lock is set to allow only applications in the optimistic set/cluster to continue having access to the resources. Thus, applications in the pessimistic set/cluster can be refused access while the lock remains set, and thus, the entire set/cluster of optimistic applications can in effect act as a single "pessimistic" application by refusing access for other pessimistic applications, though each of the optimistic applications continues to enjoy access.

At block 315, the flow includes sending current resource availability information to the application, and at block 320, a "launch task" request may be received from the application. A conflict determination can occur at block 325, and if a conflict exists (e.g., is this application a "losing" party of a conflict), evidence of the conflict can be recorded in a historical data store 330 (e.g., for later model generation), and the flow can loop back to provide updated current resource availability information to the application, etc. (Of course, in some embodiments where a conflict exists, this application could be deemed the "winner," and the flow could continue to block 335.)

If no such conflict exists at block 325 (or if the application is the winner of a conflict), the flow can continue to block 335, where the launch task request can be forwarded to the cloud infrastructure for task placement, and at block 340, the lock can be modified or cleared.

Figure 4:
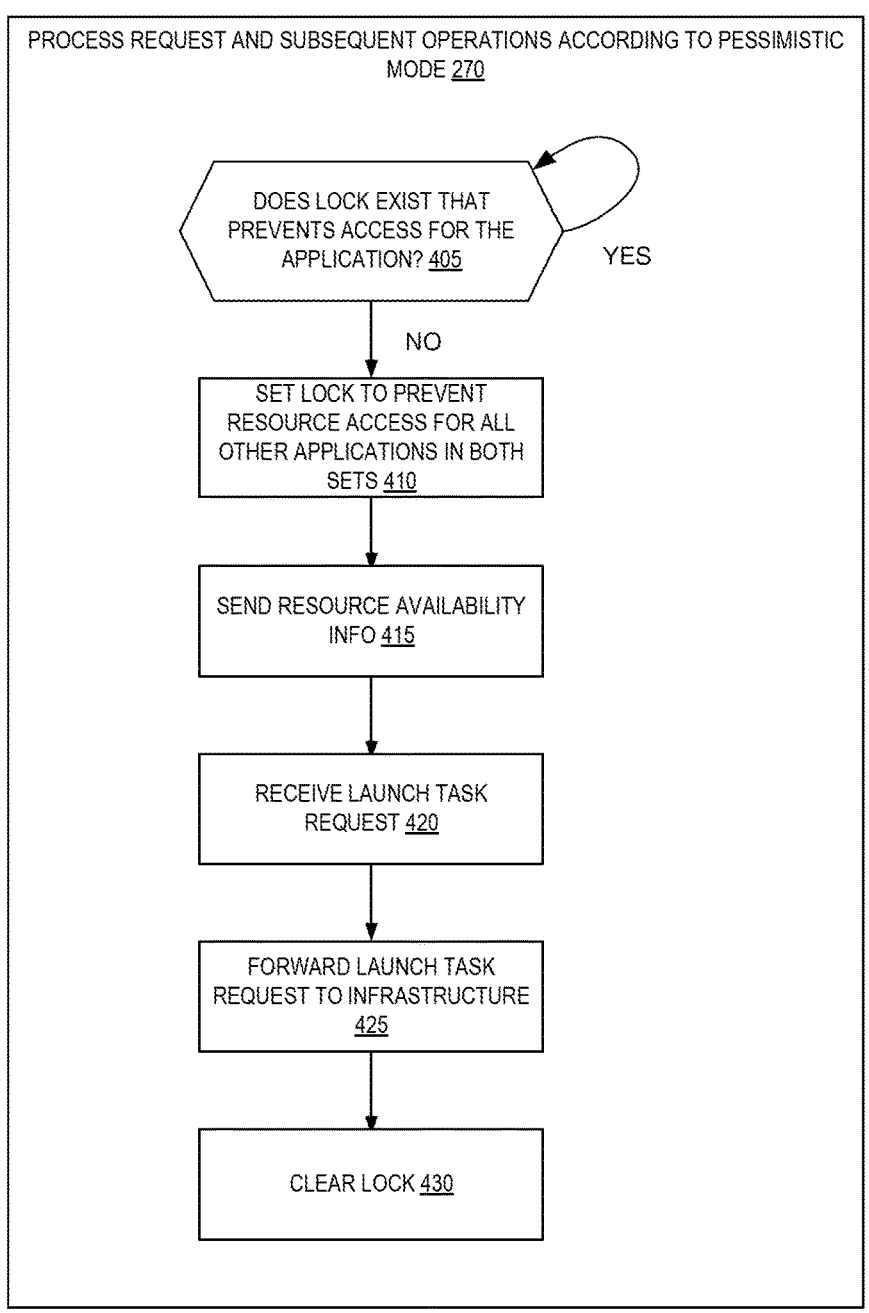
FIG. 4 is a flow diagram illustrating a flow for request processing in a pessimistic mode according to some embodiments.

Turning back to FIG. 2, when the application is instead assigned to (e.g., categorized into) the pessimistic cluster, the flow 250 continues to block 270, where access to the cloud resources is provided to the application using the pessimistic allocation mode. For an example of block 270, we turn to FIG. 4, which is a flow diagram illustrating a flow 400 for request processing in a pessimistic mode according to some embodiments.

At decision block 405, the flow 400 includes determining whether a lock exists that prevents access to the resources for the application. If so, the flow 400 can continue back to block 405 (e.g., a spin-lock, similar to the lock described above for flow 300) or terminate. If no lock exists (or when the lock no longer exists), the flow 400 can continue to block 410, where a lock is set to prevent access to the resources for all applications in both sets—i.e., all other applications in the pessimistic cluster (if any), and all other applications in the optimistic cluster. Thus, the application is provided exclusive access at this time.

At block 415, resource availability information indicating available resources is sent to the application, and at block 420, a launch task request is received from the application. Accordingly, at block 425 the launch task request can be forwarded to the cloud infrastructure for placement. Note that no conflict checking is included at this point due to the exclusive access (via the lock) that has been provided to the application; thus, a conflict is not possible. At block 430, the lock can be cleared.

For further detail illustrating these use cases and some messaging formats (e.g., used with Resource API 128), we turn to FIGS. 5-10, which provide diagrams for several scenarios, such as when one application from a pessimistic cluster launches tasks, two applications from the pessimistic cluster attempt to launch tasks, two applications from the optimistic cluster attempt to launch tasks, two applications from different clusters attempt to launch tasks, a new application registers to the resource manager module, and a new cluster is identified to the resource manager module. In FIGS. 5-9, we assume that four applications exist and that the system has already been trained, resulting in two clusters of two applications each: applications 'A' 102A and 'B' 102B are in the pessimistic cluster 502, while applications 'C' 102C and 'D' 102D are in the optimistic cluster 504.

Figure 5:
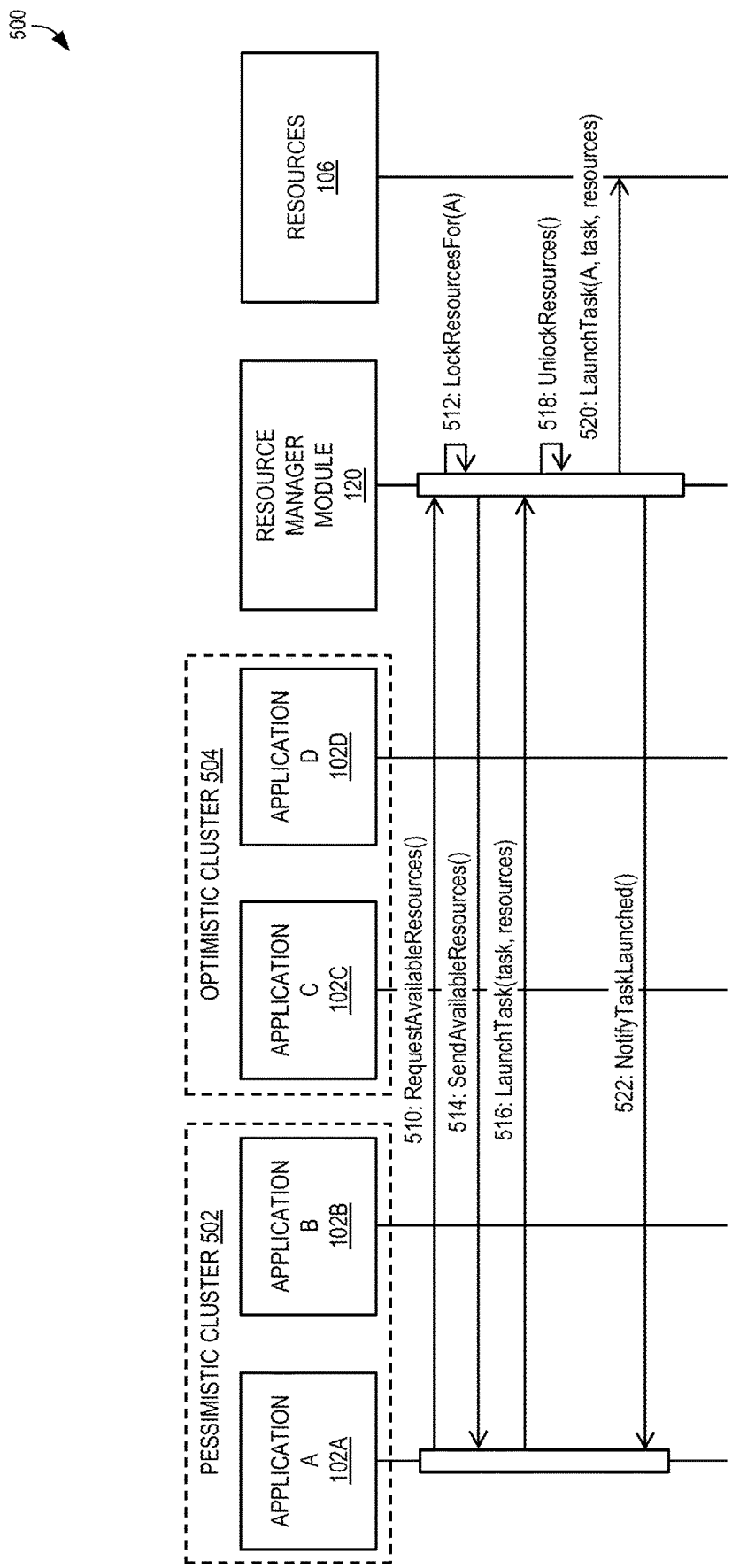
FIG. 5 is a sequence diagram illustrating an application from the pessimistic cluster attempting to launch a task according to some embodiments.

First, FIG. 5 is a sequence diagram illustrating operations 500 for an application from the pessimistic cluster attempting to launch a task according to some embodiments. At 510, application 'A' 102A sends a RequestAvailableResources()request to the resource manager module 120. In response, the resource manager module 120 sets a lock for the resources for application "A" 102A at operation 512 until some event (e.g., application 'A' 102A launches a task, a timeout period has expired, etc.). Due to application 'A' 102A being in the pessimistic cluster 502, this lock prohibits all other applications (B-D) from being able to access the resources until the lock is cleared. At 514, the resource manager module 120 transmits a SendAvailableResources() response back to application 'A' 102A describing the currently available resources.

At 516, a LaunchTask message is sent from application 'A' 102A to the resource manager module 120 seeking to launch a particular "task" using a particular set of "resources" selected from the provided set of available resources (message 514). Accordingly, the resource manager module 120 can unlock the other resources that are not part of the particular set at 518 (e.g., clear the lock) to allow other applications to launch tasks on those resources, forward the launch task request at 520 to the resources 106 (e.g., cloud infrastructure), and send a NotifyTaskLaunched message at 522 back to application 'A' 102A indicating that the task was successfully launched. If, however, the task was unable to be launched, a NotifyTaskLaunchFailure (or similar) message (not illustrated) could alternatively be sent back to application 'A' 102A. Additionally, because no conflicts can occur in pessimistic mode, there is no need to perform any checks for them.

Figure 6:
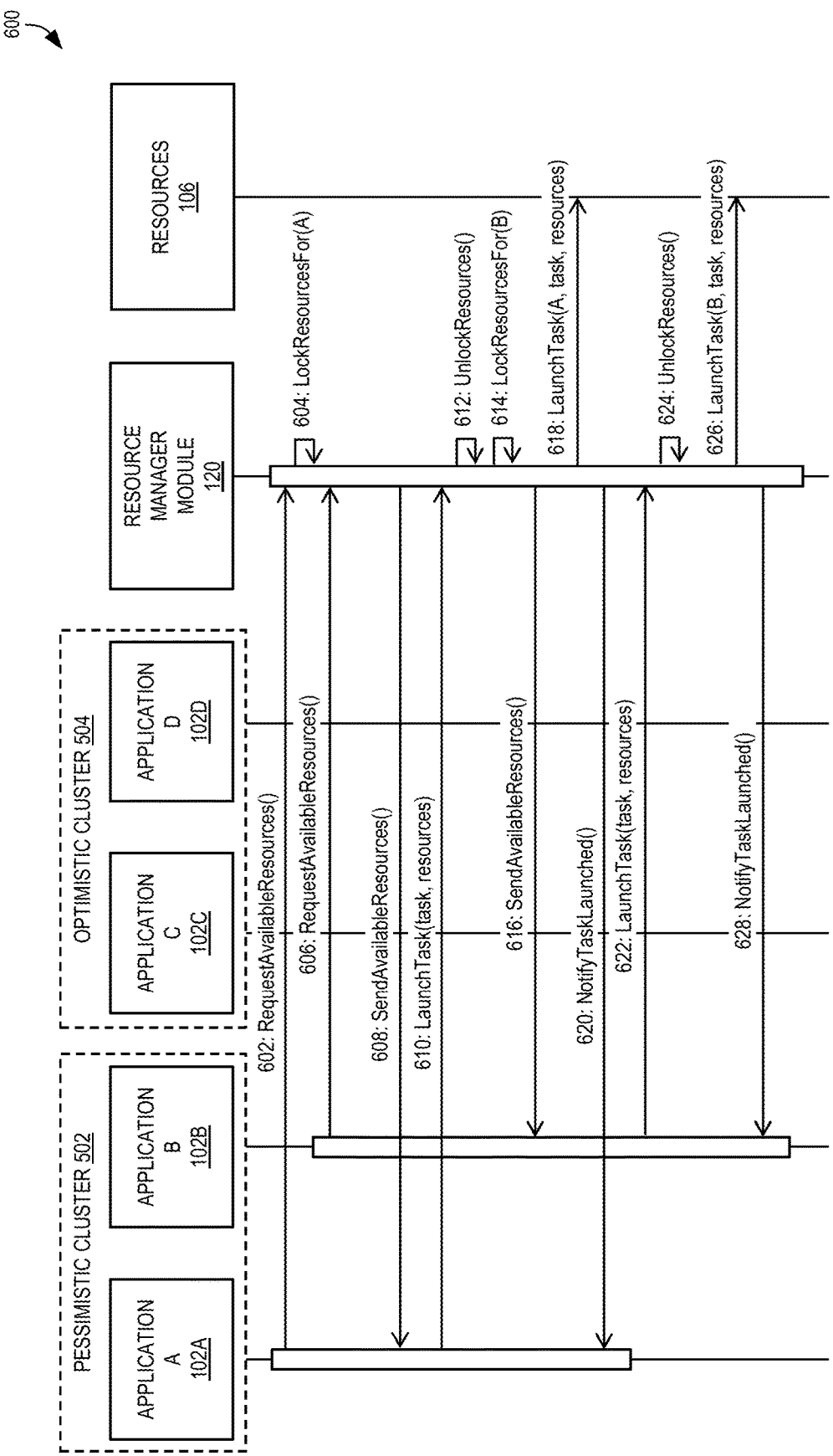
FIG. 6 is a sequence diagram illustrating two applications from the pessimistic cluster attempting to launch tasks according to some embodiments.

For further complexity, we turn to FIG. 6, which is a sequence diagram illustrating operations 600 for two applications from the pessimistic cluster attempting to launch tasks according to some embodiments. In this figure, both application 'A' 102A and application 'B' 102B attempt to launch a task at the same time (see messages 602 and 606).

The resource manager module 120, in this embodiment, handles the situation as follows: the request from application 'A' 102A is handled in the same manner as detailed in the previous diagram, as it is the first one requesting resources (i.e., its request 602 is received prior to receipt of request 606). Thus, a lock is placed at 604 for application 'A' 102A, and after communication of messages 608 and 610, the other resources that are not part of the particular set used by application 'A' 102A can be unlocked at 612 and then re-locked for application 'B' 102B at 614, and an updated list of available resources is sent to application 'B' 102B to enable it to launch its task(s) using current resource availability information. Thus, application 'B' 102B must wait for application 'A' 102A to decide which resources application 'A' 102A will use before application 'B' 102B can even get a list of available resources, which therefore guarantees that no conflict can occur—at the cost of a waiting period for application 'B' 102B.

Figure 7:
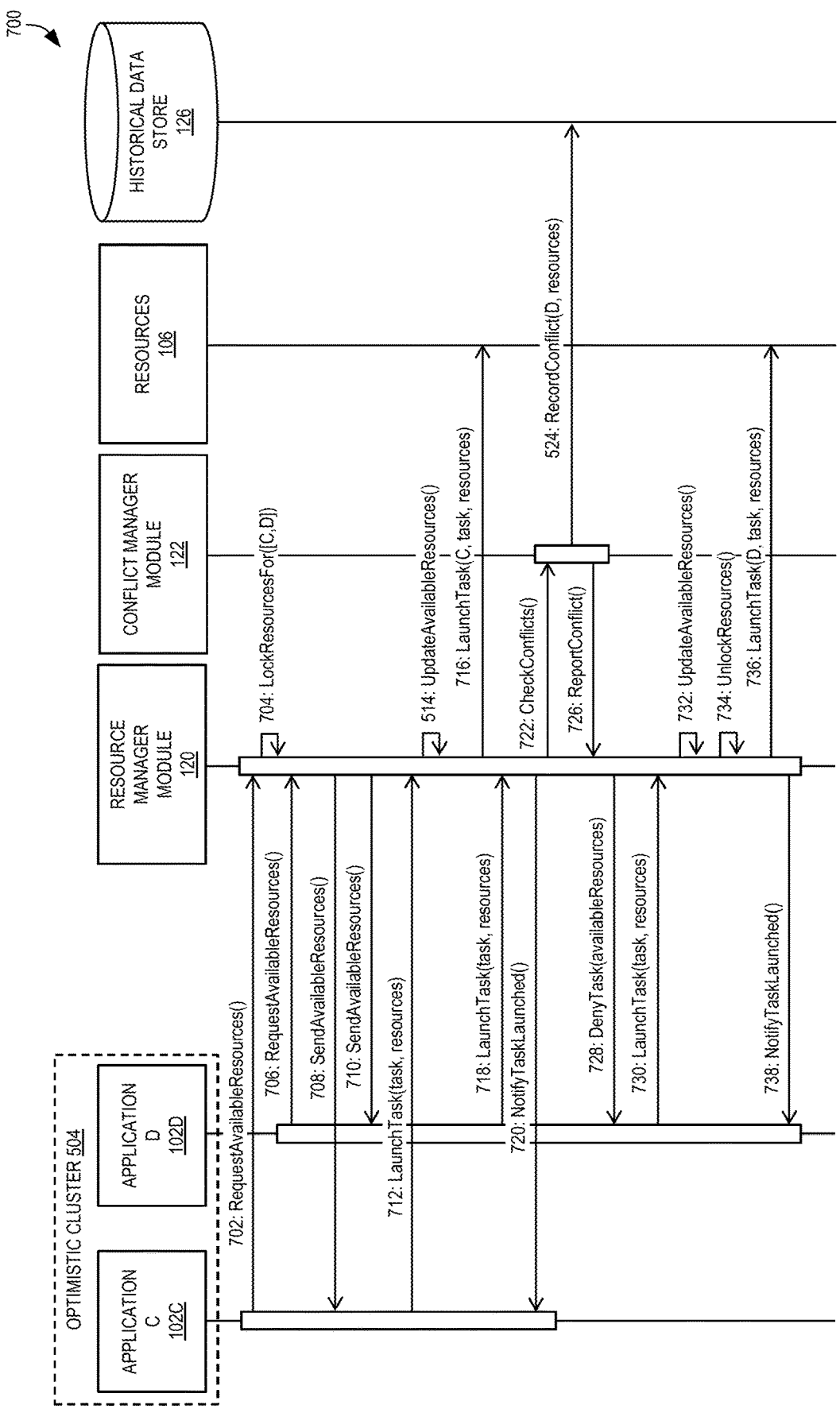
FIG. 7 is a sequence diagram illustrating two applications from the optimistic cluster attempting to launch tasks according to some embodiments.

In contrast to dealing with multiple applications from the pessimistic cluster, FIG. 7 is a sequence diagram illustrating operations 700 for two applications 102C-102D from the optimistic cluster 504 attempting to launch tasks according to some embodiments. In FIG. 7, application 'C' 102C and application 'D' 102D from the optimistic cluster are both attempting to launch tasks (see, e.g., messages 702 and 706). The resource manager module 120 can handle the situation as follows.

When an application from the optimistic cluster 504 requests the list of available resources (702, 706), the resource manager module 120 can place a lock of the resources allowing only all applications in the optimistic cluster 504 to continue access (see messages 708 and 710, providing available resource information concurrently to different applications in the optimistic cluster 504), and thus, prevent any applications in the pessimistic cluster 502 (not illustrated) from gaining access. This allows other applications from the optimistic cluster 504 to concurrently request resources while forcing applications from the pessimistic cluster 502 to wait until the lock is removed.

However, as illustrated, when application 'D' 102D launches its task at 718, it does so while working with a not up-to-date list of available resources (because of the task being launched at 712 and 716 by application 'C' 102C, which has removed some resources identified at 708 and 710 from being available). Thus, at 722 the resource manager module 120 will therefore check for potential conflicts on the requested resources with the conflict manager module 122.

If a conflict is detected (which is assumed in this figure), application 'D' 102D gets notified at 728 that the task could not be launched and that it should pick resources from a new updated list of available resources that can be included with the message 728. The conflict is also recorded at 524 in the historical data store 126 so that it can be taken into account when re-computing the clusters (e.g., regenerating the model). However, if no conflict had been detected, the task would have been launched directly (not shown in the figure) similar to 716 for application 'C' 102C.

In the second attempt to launch the task at 730, as application 'D' 102D is working with an up-to-date list of available resources, there is no need to check for conflicts, and at 732 the tracked amount of available resources can be updated (i.e., to account for the resources to be used by the task launched at 730), at 734 the other available resources that are not part of the resources to be used by the task launched at 730 can be unlocked, and at 736 the task can be launched and then reported back at 738 to application 'D' 102D.

In summary, in this case, application 'D' 102D does not need to wait for application 'C' 102C to complete its task allocation to attempt to launch a task, although this occurs with a risk of conflict.

Figure 8:
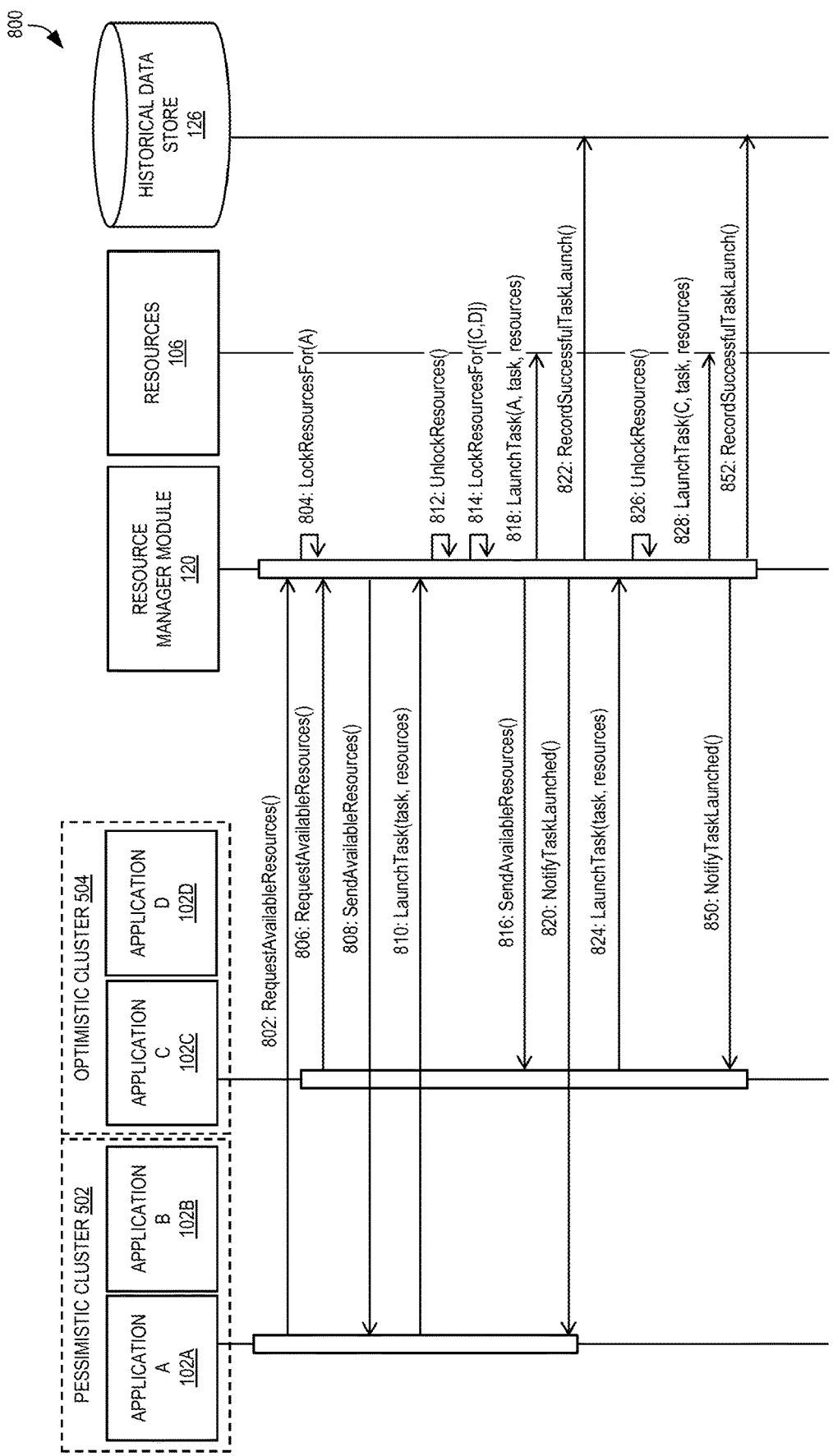
FIG. 8 is a sequence diagram illustrating one application from the pessimistic cluster and one application from the optimistic cluster both attempting to launch tasks according to some embodiments.

For further detail illustrating the relationship between the different clusters in the hybrid model, we turn to FIG. 8, which is a sequence diagram illustrating operations 800 for one application 102A from the pessimistic cluster 502 and one application 102C from the optimistic cluster 504 both attempting to launch tasks according to some embodiments. In FIG. 8, application 'A' 102A and application 'C' 102C respectively belong to the pessimistic cluster 502 and the optimistic cluster 504 and are both attempting to launch a task. In this case, the resource manager module 120 can handle the situation as follows.

As application 'A' 102A from the pessimistic cluster 502 is the application that requested a list of available resources first (at 802 compared to 806), all resources are locked at 804 to it alone (i.e., locked from any others in the pessimistic or optimistic cluster) and application 'A' 102A can thus launch the task at 810 without waiting.

As soon as application 'A' 102A launches its task at 810, the lock on the other resources that are not part of the particular set used by application 'A' 102A is removed at 812, and as the next application to have requested a list of available resources is application 'C' 102C in the optimistic cluster, a new lock is set at 814 for all applications in the optimistic cluster 504 (i.e., application 'C' 102C and application 'D' 102D). Accordingly, while the lock remains set, other applications from the optimistic cluster 504 could successfully request resource information and attempt to launch tasks; however, none of the applications of the pessimistic cluster 502 could do so.

Figure 9:
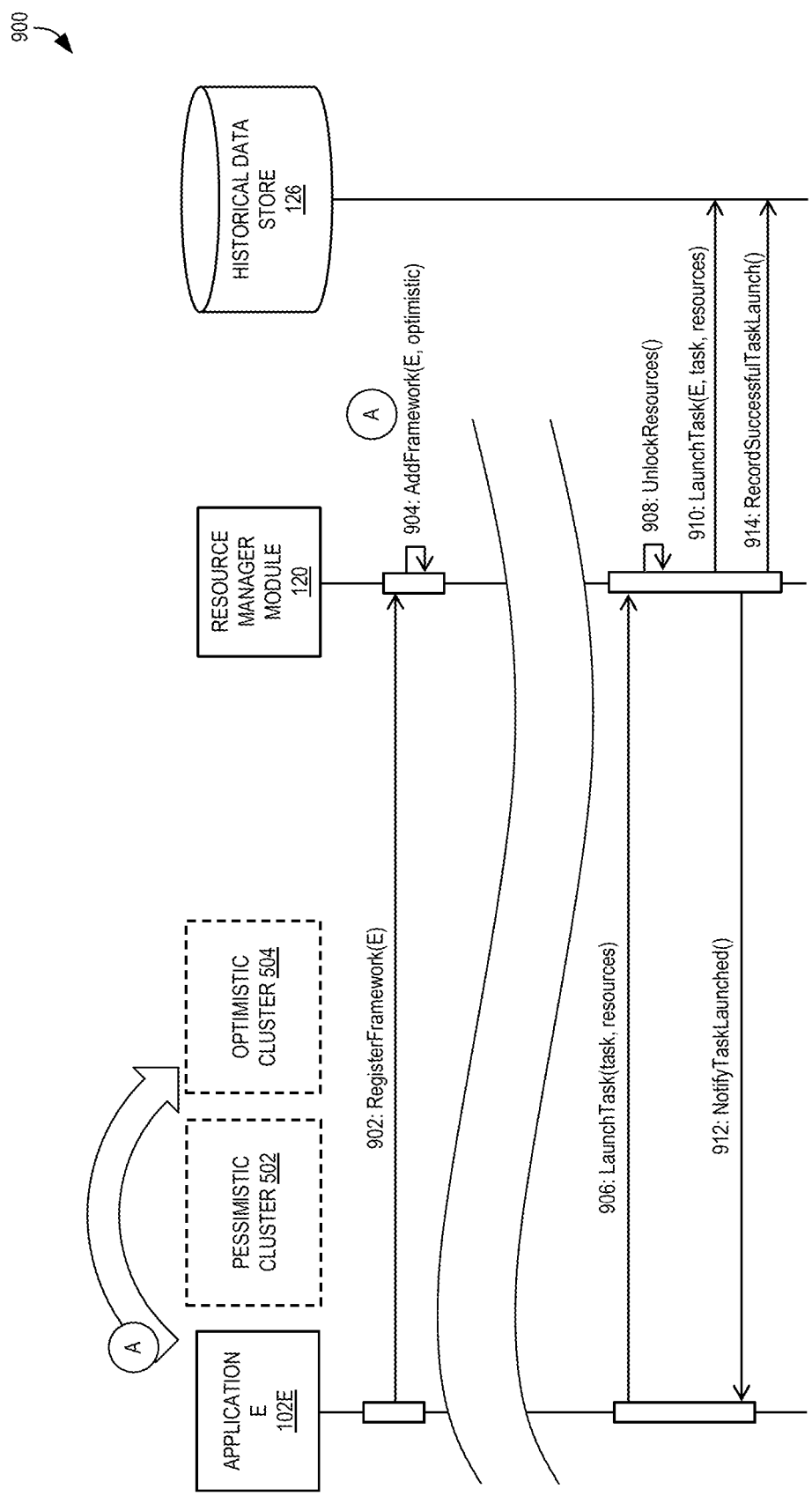
FIG. 9 is a sequence diagram illustrating an application registering with the resource manager module according to some embodiments.

We now turn to FIG. 9, which is a sequence diagram illustrating operations 900 for an application registering with the resource manager module 120 according to some embodiments. When a new application 'E' 102E (i.e., framework) registers at 902 with the resource manager module 120, in some embodiments the new application 'E' 102E is automatically placed into the optimistic cluster 504 (at circle 'A') as there is no history of past conflicts involving that application. Once the newly-added application starts to launch tasks, activity records can be populated in the historical data store 126 (see 910 and/or 914) and if any conflicts occur, they will be taken into account the next time the cluster model builder module 124 generates an updated model 125.

As described herein, when the resource manager module 120 receives a request to provide the list of available resources, it "locks" said resources either for the requesting application alone, or for all applications belonging to the optimistic cluster (i.e., if the requesting application is categorized into that optimistic cluster). In the examples presented above, the resources are locked as soon as the request is received. An advantage of this approach is that when addressing applications belonging to the pessimistic cluster, it is guaranteed that no conflict will ever occur at the cost of systematically locking.

However, in other embodiments, other schemes can be utilized. For example, in some embodiments, locking can occur when the application actually launches a task. An advantage of this approach is that no lock is set if an application requests the list of available resources without submitting a launch task request later on. However, under this policy there is a possibility of having conflicts if a second application requests the list of available resources while the first one is preparing to launch a task.

Figure 10:
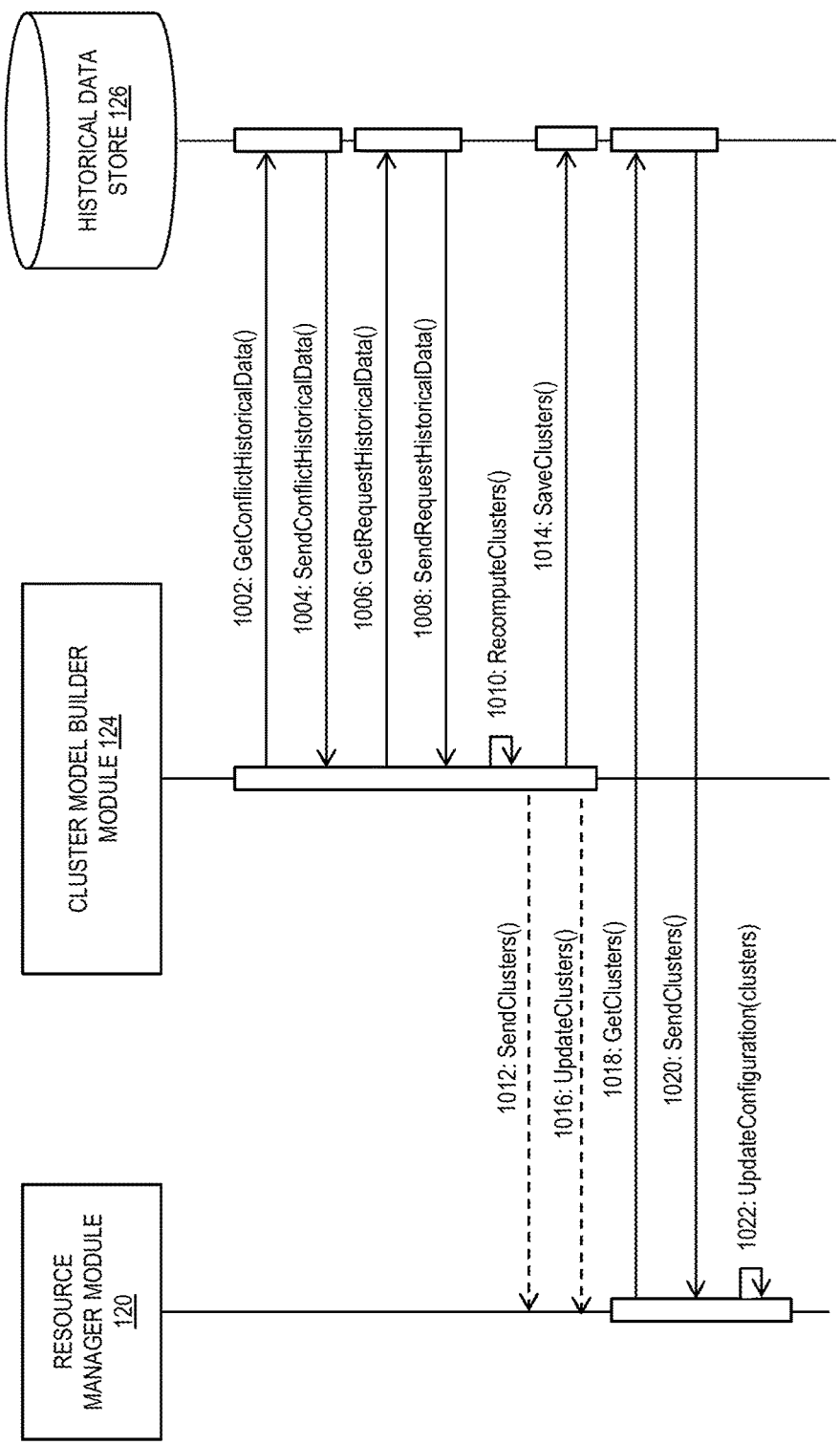
FIG. 10 is a sequence diagram illustrating operations for precomputing and distributing updated cluster information according to some embodiments.

We now turn to FIG. 10, which is a sequence diagram illustrating operations 1000 for precomputing and distributing updated cluster information according to some embodiments.

In some embodiments, the cluster model builder module 124 (periodically) re-computes the optimistic and pessimistic clusters according to conflict and request historical data (see messages 1002, 1004, 1006, 1008). Once the clusters have been recomputed at 1010, they can optionally be sent at 1012 to the resource manager module 120, and/or saved within the data store 126. In some embodiments, after saving the clusters/model at 1014 to the data store 126, the cluster model builder module 124 can send an "update clusters" 1016 message, causing the resource manager module 120 to retrieve the clusters/model (see 1018 and 1020) from the data store 126. Once the resource manager module 120 is in possession of the clusters/model, at 1022 it can update its configuration (e.g., the application-cluster map 134 data).

As described throughout, a model can be generated by the cluster model builder module 124 to determine which cluster the applications will be placed in (i.e., categorized into). Exemplary operations for such model generation are presented here.

Some embodiments utilize a machine-learning algorithm that powers the cluster model builder module 124, which is described below in two parts: (1) an application conflict metric, and (2) a clustering algorithm. An application conflict metric determines to which cluster a particular application will be classified/categorized. The clustering algorithm can be used to compute the clusters periodically.

Regarding the conflict metric, some embodiments utilize a clustering algorithm that groups or categorizes applications into two clusters (pessimistic and optimistic) based on a conflict metric x_j. Conflict occurs when two applications attempt to launch tasks on a same resource at substantially the same time. Formally, the conflict metric can be defined as follows: let R_j be the total number of task launch requests of an application j; let c_rj be a binary variable (i.e., taking values 0 or 1) indicating whether a conflict has happened for a particular task launch request r and application j; and let a_j be defined as a vector of requested resources (e.g., CPU, RAM, network) for an application j. In some embodiments, the dimensions d of the a_j vector can be rescaled to [0,1], using the following Eq. 1:

$$a_{d,j} = \frac{a_{d,j} - \min(a_{d,j})}{\max(a_{d,j}) - \min(a_{d,j})} \quad \text{(Equation 1: Conflict metric)}$$

In some embodiments, the requested resources vector is normalized to obtain a scalar value using the Euclidean norm (also called the L2 norm). However, in various embodiments other norms can be used.

Additionally, some applications tend to cause more severe conflicts than others. For example, an application requesting all cluster resources will inevitably cause a conflict compared to applications requesting only a fraction of the resources. Thus, some embodiments use w_j as a weight between [0, 1] to punish such applications requesting all or most cluster resources.

Accordingly, some embodiments use the final conflict metric defined in Eq. 2, which can be computed as a weighted ratio of the number of per-application task launch requests to total number of task launch requests.

$$x_j = \frac{\sum_{r=1}^{R_j} c_{r,j} \times w_j \|\vec{a}_j\|_2}{R_j} \quad \text{(Equation 2: Conflict metric)}$$

With regard to the clustering algorithm, the general problem to be solved is defined as follows. Let K be the number of clusters (e.g., K=2), and x_j the conflict metric of an application j. Moreover, let C={C1, ..., C_K} be the set of clusters and u_i the centroid of cluster i. In some embodiments, the goal is to partition the applications into two clusters such that the within-cluster sum of squares (WCSS) objective function is minimized. The WCSS is defined in Eq. 3:

$$F = \sum_{i=1}^{K} \sum_{x_j \in C_i} \|x_j - \mu_i\|^2 \quad \text{(Equation 3: Objective function)}$$

As the aforementioned problem is NP-hard (i.e., non-deterministic polynomial-time hard), some embodiments utilize a greedy algorithm for finding a sub-optimal solution that can be performed in a reasonable amount of time. Specifically, some embodiments somewhat follow the well-known K-Means algorithm and can work as follows.

First, the conflict metric is computed for all applications. Two applications whose conflict metrics are furthest apart (e.g., according to the Euclidian distance) are chosen as the initial cluster centroids. By choosing the two furthest apart applications, the intention is to create non-overlapping clusters. Afterwards, the conflict metrics for the remaining applications can be observed, and applications are assigned to clusters for which they are closest. Once all applications are assigned to their closest clusters, the cluster centroids are recomputed and applications can be reassigned to their closest cluster centroids. The latter process can repeat for a predefined number of iterations I. The new cluster centroids u_j are computing using arithmetic mean of all applications' conflict metrics within a cluster (see Eq. 4), which ensures that cluster centroids gradually move towards the middle of their corresponding clusters:

$$\mu_i = \frac{1}{|C_i|} \sum_{x_j \in C_i} x_j \quad \text{(Equation 4: Cluster centroid update)}$$

Various embodiments disclosed herein involve the use of electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 11:
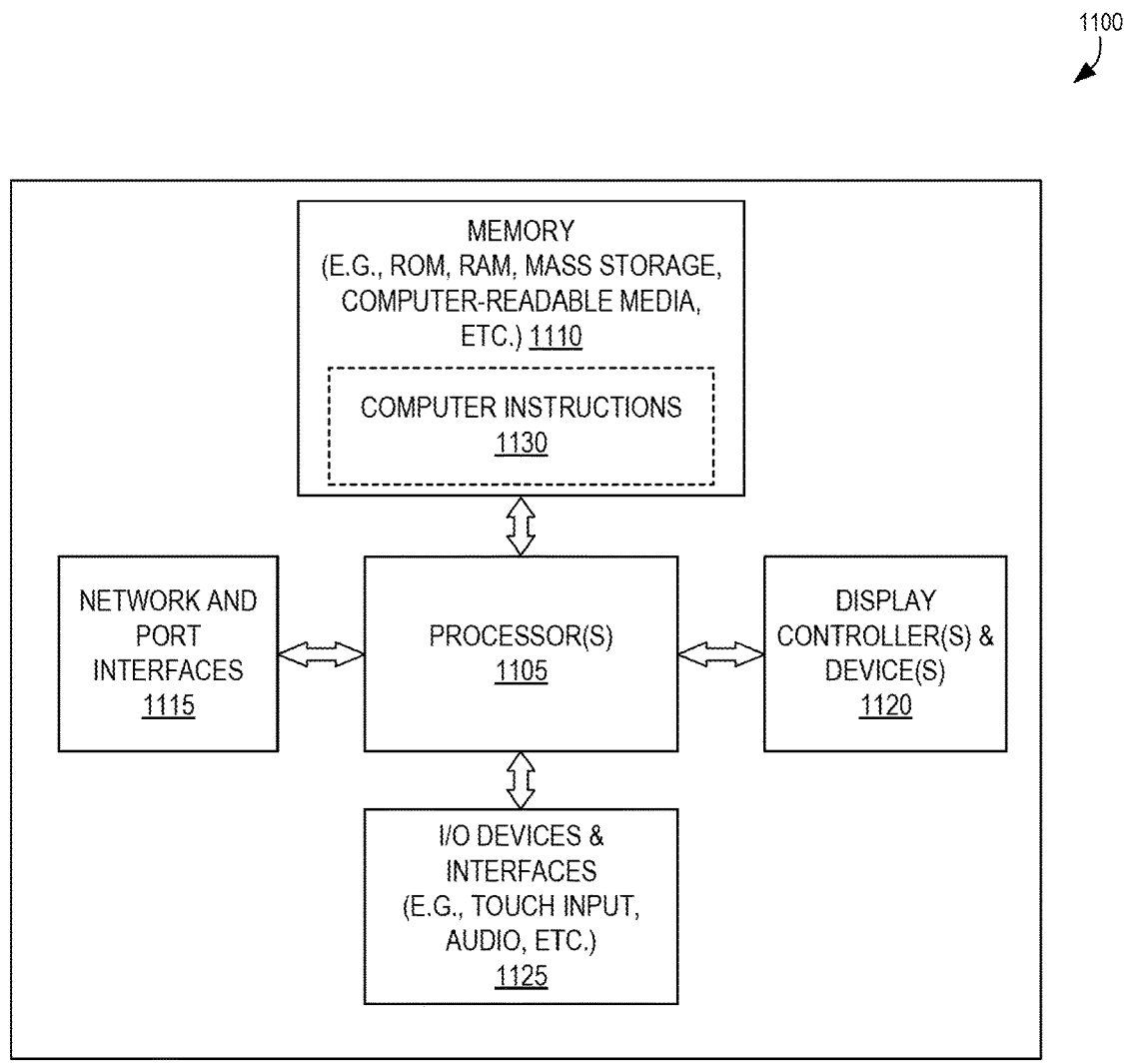
FIG. 11 is a block diagram illustrating an exemplary data processing system that may be used in some embodiments.

FIG. 11 is a block diagram illustrating an exemplary data processing system that may be used in some embodiments. Data processing system 1100 includes one or more microprocessors 1105 and connected system components (e.g., multiple connected chips). Alternatively, the data processing system 1100 is a system on a chip. One or more such data processing systems 1100 may be utilized to implement the functionality of the modules, server end stations, hosts, or other devices as illustrated above in FIGS. 1-10.

The data processing system 1100 includes memory 1110, which is coupled to the microprocessor(s) 1105. The memory 1110 may be used for storing data, metadata, and programs for execution by the microprocessor(s) 1105. For example, the depicted memory 1110 may store computer instructions 1130 that, when executed by the microprocessor(s) 1105, causes the data processing system 1100 to perform the operations described herein. The memory 1110 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1110 may be internal or distributed memory. In some embodiments, a portion or all of the computer instructions 1130 are stored on an external cloud device.

The data processing system 1100 may also include a display controller and display device 1120 that provides a visual user interface for the user, e.g., Graphical User Interface (GUI) elements or windows. The display device 1120 may also display various media content to the user. The data processing system 1100 also includes one or more input or output ("I/O") devices and interfaces 1125, which are provided to allow a user to provide input to, receive output from, and otherwise transfer data to and from the system.

These I/O devices 1125 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1100. The I/O devices and interfaces 1125 may also include a connector for a dock or a connector for a Universal Serial Bus (USB) interface, FireWire, Thunderbolt, Ethernet, etc., to connect the system 1100 with another device, external component, or a network. Exemplary I/O devices and interfaces 1125 also include wireless transceivers, such as an Institute of Electrical and Electronics Engineers (IEEE) 802.11 transceiver, an infrared transceiver, a Bluetooth transceiver, a wireless cellular telephony transceiver (e.g., 2G, 3G, 4G, 5G), or another wireless protocol to connect the data processing system 1100 with another device, external component, or a network and receive stored instructions, data, tokens, etc. In some embodiments, these various components will be provided as a system on a chip (SoC). It will be appreciated that one or more buses may be used to interconnect the various components shown in FIG. 11.

For example, the data processing system 1100 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1100 may be a network computer, server, network device, router, or an embedded processing device within another device or consumer electronic product. As used herein, the terms computer, system, device, processing device, and "apparatus comprising a processing device" may be used interchangeably with the term data processing system 1100 and include the above-listed exemplary embodiments.

It will be appreciated that additional components, not shown, may also be part of the system 1100, and, in some embodiments, fewer components than that shown in FIG. 11 may also be used in a data processing system 1100. For example, in some embodiments where the data processing system 1100 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1110 or other non-transitory machine-readable storage medium. The software may further be transmitted or received over a network (not shown) via a network and/or port interface 1115. In various embodiments, hardwired circuitry may be used in combination with the software instructions to implement the present embodiments. Thus, the techniques are not limited to any specific combination of hardware circuitry and software, or to any particular source for the instructions executed by the data processing system 1100.

Alternative Embodiments

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Similarly, while the flow diagrams in the figures show a particular order of operations performed by some embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, various embodiments are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a hybrid resource allocation module implemented by one or more computing devices, the method comprising:
   receiving, from a first application of a plurality of applications, a first request for resource availability information of resources provided by a set of computing devices;
   determining, based at least in part on a use of a machine learning model, that the first application is categorized into a first cluster of applications, wherein the machine learning model categorizes applications into at least the first cluster and a second cluster;
   providing the resource availability information to the first application; and
   setting a lock to prevent any application that is categorized into the second cluster from being able to obtain resource availability information while the lock is set, wherein any application that is categorized into the first cluster can still obtain available resource information while the lock is set.

2. The method of claim 1, further comprising:
   receiving a second request for resource availability information from a second application of the plurality of applications while the lock is set;
   determining that the second application has been categorized into the first cluster; and
   providing the available resource information to the second application while the lock is set.

3. The method of claim 2, further comprising:
   receiving, from the first application, a request to launch a first task;
   receiving, from the second application, a request to launch a second task;
   and determining, by the hybrid resource allocation module, whether a resource conflict results from the request to launch the second task.

4. The method of claim 1, further comprising:
   receiving a third request for available resource information from a third application of the plurality of applications while the lock is set;
   determining that the third application has been categorized into the second cluster; and
   waiting to provide the available resource information to the third application at least until the lock is no longer set.

5. The method of claim 4, further comprising:
   releasing the lock;
   providing the available resource information to the third application; and
   setting a second lock to prevent all other applications categorized into the second cluster and all of the applications categorized into the first cluster from being able obtain available resource information while the second lock remains set.

6. The method of claim 1, further comprising training the machine learning model based at least in part on a history of activity involving the plurality of applications.

7. The method of claim 6, wherein training the machine learning model is based on one or more of:
   one or more resource reservation request conflicts from the history of activity; or
   one or more task launch requests from the history.

8. The method of claim 6, further comprising:
   updating the machine learning model, resulting in at least one of the plurality of applications that was previously categorized into the second cluster to now be categorized into the first cluster.

9. The method of claim 6, wherein the training the machine learning model comprises:
   calculating a plurality of conflict metrics corresponding to the plurality of applications; and
   clustering the plurality of applications into at least the first cluster and the second cluster based on the plurality of conflict metrics.

10. A non-transitory computer-readable storage medium having instructions which, when executed by one or more processors of a computing device, cause the computing device to implement a hybrid resource allocation module to perform operations comprising:
    receiving, from a first application of a plurality of applications, a first request for resource availability information of resources provided by a set of computing devices;
    determining, based at least in part on a use of a machine learning model, that the first application is categorized into a first cluster of applications, wherein the machine learning model categorizes applications into at least the first cluster and a second cluster;
    providing the resource availability information to the first application; and
    setting a lock to prevent any application that is categorized into the second cluster from being able to obtain resource availability information while the lock is set, wherein any application that is categorized into the first cluster can still obtain available resource information while the lock is set.

11. The non-transitory computer-readable storage medium of claim 10, wherein the operations further comprise:
    receiving a second request for resource availability information from a second application of the plurality of applications while the lock is set;
    determining that the second application has been categorized into the first cluster; and
    providing the available resource information to the second application while the lock is set.

12. The non-transitory computer-readable storage medium of claim 11, wherein the operations further comprise:
    receiving, from the first application, a request to launch a first task;
    receiving, from the second application, a request to launch a second task; and
    determining, by the hybrid resource allocation module, whether a resource conflict results from the request to launch the second task.

13. The non-transitory computer-readable storage medium of claim 10, wherein the operations further comprise:

receiving a third request for available resource information from a third application of the plurality of applications while the lock is set;
determining that the third application has been categorized into the second cluster; and
waiting to provide the available resource information to the third application at least until the lock is no longer set.

14. The non-transitory computer-readable storage medium of claim 13, wherein the operations further comprise:
releasing the lock;
providing the available resource information to the third application; and
setting a second lock to prevent all other applications categorized into the second cluster and all of the applications categorized into the first cluster from being able obtain available resource information while the second lock remains set.

15. The non-transitory computer-readable storage medium of claim 10, wherein the operations further comprise training the machine learning model based at least in part on a history of activity involving the plurality of applications.

16. The non-transitory computer-readable storage medium of claim 15, wherein training the machine learning model is based on one or more of:
one or more resource reservation request conflicts from the history of activity; or
one or more task launch requests from the history.

17. The non-transitory computer-readable storage medium of claim 15, wherein the operations further comprise:
updating the machine learning model, resulting in at least one of the plurality of applications that was previously categorized into the second cluster to now be categorized into the first cluster.

18. The non-transitory computer-readable storage medium of claim 15, wherein the training the machine learning model comprises:
calculating a plurality of conflict metrics corresponding to the plurality of applications; and
clustering the plurality of applications into at least the first cluster and the second cluster based on the plurality of conflict metrics.

19. A system comprising:
one or more server computing devices providing resources as part of a cloud computing environment; and
a hybrid resource allocation module implemented by another one or more computing devices, the hybrid resource allocation module comprising instructions which, when executed by the one or more computing devices, cause the hybrid resource allocation module to:
receive, from ones of a plurality of applications, requests for resource availability information of the resources provided by the one or more server computing devices;
determine, based at least in part on a use of a machine learning model, for an application that provided a request whether the application is categorized into a first cluster of applications or into a second cluster of applications; and
when the requesting application is in the first cluster, provide the resource availability information to the requesting application and ensure that a lock is set to prevent any application that is categorized into the second cluster from being able to obtain resource availability information while the lock is set, wherein any application that is categorized into the first cluster can still obtain available resource information while the lock is set.

20. The system of claim 19, wherein the instructions, when executed by the one or more computing devices, further cause the hybrid resource allocation module to:
when the requesting application is in the second cluster and the lock is set, wait to provide the available resource information to the requesting application at least until the lock is no longer set; and
when the requesting application is in the second cluster and the lock is not set, provide the available resource information to the requesting application and set the lock to prevent all other applications categorized into the second cluster and all of the applications categorized into the first cluster from being able obtain available resource information while the lock remains set.

21. The system of claim 19, wherein the instructions, when executed by the another one or more computing devices, further cause the hybrid resource allocation module to:
train the machine learning model based at least in part on a history of activity involving the plurality of applications, wherein to train the machine learning model the hybrid resource allocation module is to:
calculate a plurality of conflict metrics corresponding to the plurality of applications; and
cluster the plurality of applications into at least the pessimistic cluster and the optimistic cluster based on the plurality of conflict metrics.

* * * * *